SEYMOUR SASLOW
INVENTOR.

BY *George B. Aujevolle*

ATTORNEY

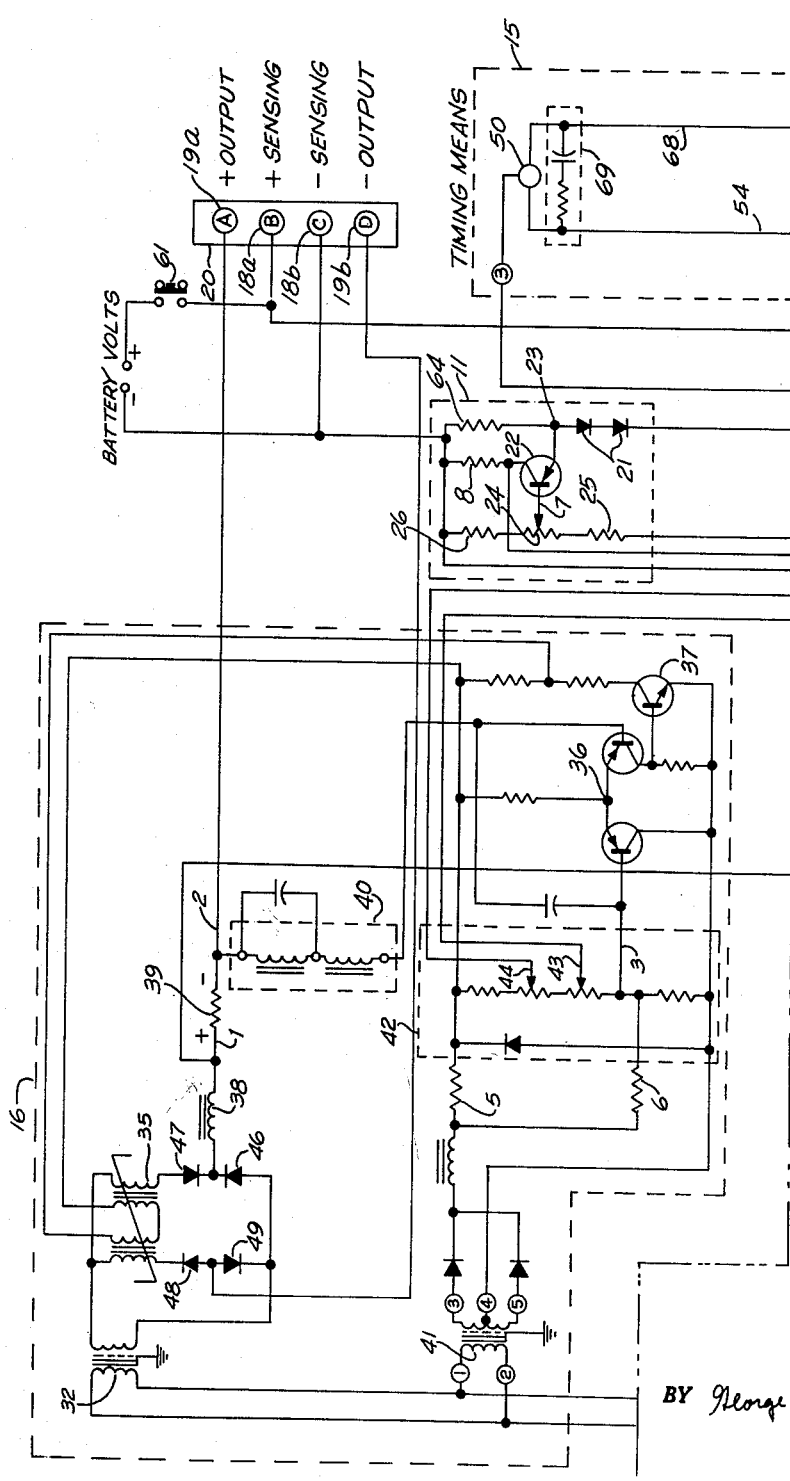

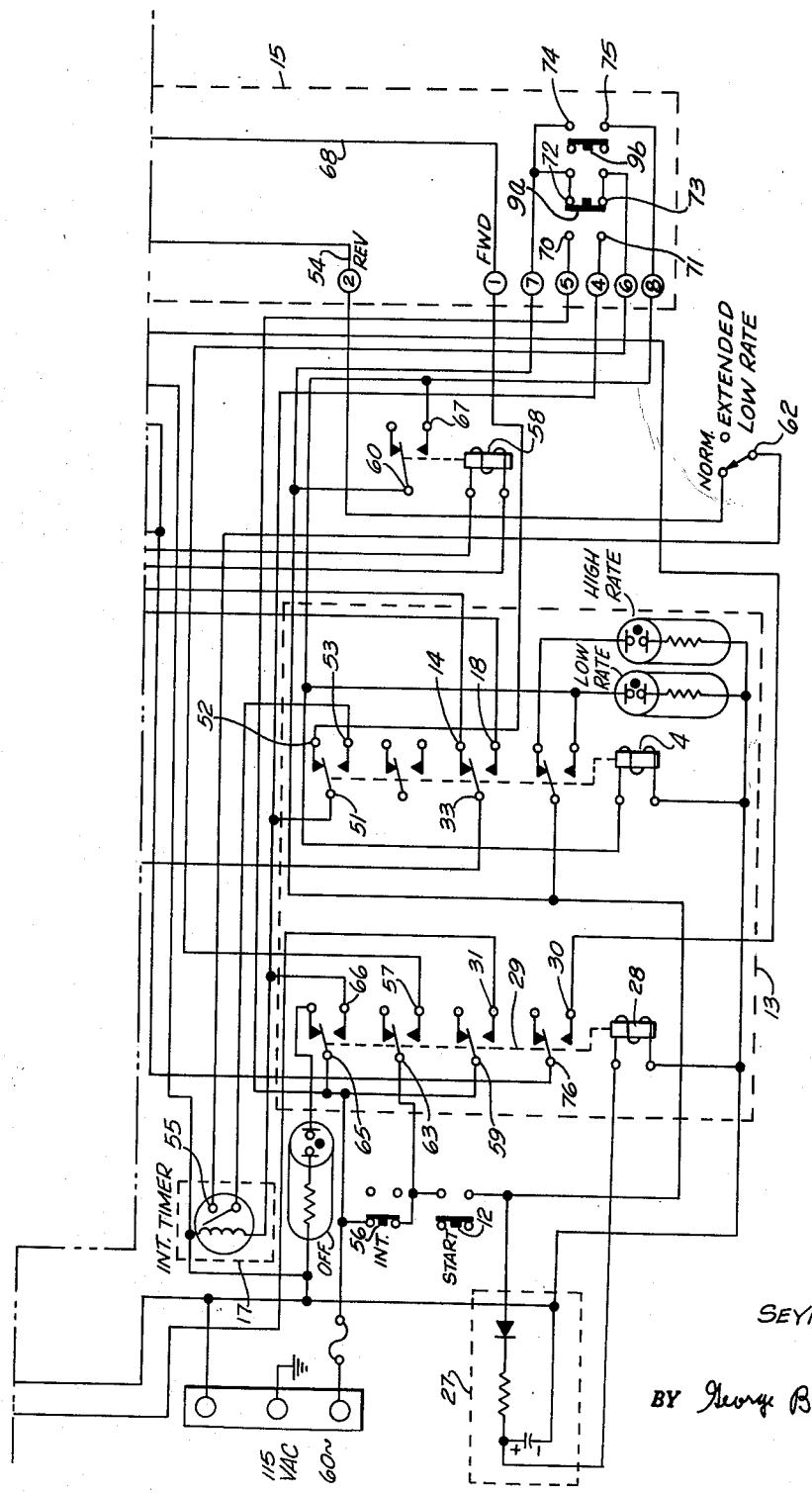

United States Patent Office 3,178,629
Patented Apr. 13, 1965

3,178,629
DUAL RATE BATTERY CHARGER WITH LOW RATE, A PRESET PERCENTAGE OF THE HIGH RATE
Seymour Saslow, Saratoga Springs, N.Y., assignor to Espey Mfg. & Electronics Corp., Saratoga Industries Division, Saratoga, N.Y., a corporation of New York
Filed Aug. 25, 1961, Ser. No. 133,828
5 Claims. (Cl. 320—23)

The present invention relates to the charging of storage batteries and more particularly to an apparatus for automatically charging storage batteries.

The typical storage battery consists of two or more cells connected together which convert chemical energy into electrical energy by reactions that are essentially reversible. Charging is accomplished by passing an electric current through the cells in the opposite direction to that of the discharge. During this process, electrical energy is transformed into chemical energy which is stored and may be used again at some later time as electrical energy.

Since batteries have been in use for over one hundred years, it would seem natural that the art of charging batteries would be complete and that everything is now known that should be known on the subject. This, strangely enough is not the case. For many years, because of lack of precise knowledge on charging batteries, the practice was to gradually lower the charge current as the charge progressed. This required a person in constant attendance who would periodically measure the specific gravity of the electrolyte and then lower the value of the charging current. The gassing of the electrolyte was used to indicate the completion of the charge and when gassing had continued for from two to four hours, the charge was considered complete. Because of the expense involved in the method where the current is gradually lowered, the practice developed of charging the battery at a constant rate for a fixed period of time recommended by the battery manufacturer, and then lowering the charging rate for another fixed period of time. Carelessness on the part of battery service personnel often results in no test being performed either before, during or after the charge has been applied. Thus, today, after one hundred years of using batteries the charge applied to a battery remains very much the opinion of a minor technician.

Many charging systems in use today severely overcharge the batteries. This causes corrosion of the plates and excessive gassing which loosens the active material in the plates and subsequent battery failure occurs. Severe overcharging also causes excessive temperature rise in the cells with some cases of cell buckling and thereby causing shorts. The excessive gassing also results in a needless loss of water which requires constant attention by an operator to maintain the proper level of electrolyte.

Many charging systems in use today undercharge batteries which causes a gradual running down of the cells. Consistent undercharging will cause some cells of the battery to become exhausted before the others and thereby become reversed by the other cells of the battery. Undercharging is also a most common cause of cell buckling.

Although many attempts may have been made to overcome the foregoing disadvantages and other difficulties, none, as far as I am aware, have been entirely successful when carried into practice commercially on an industrial scale.

It has now been discovered that an apparatus can be devised for automatically charging batteries so as to properly restore their rated ampere hour capacity.

Thus, it is an object of the present invention to provide an automatic charging system which will charge a battery based on its state of discharge.

It is also an object of the present invention to prevent excessive charging of batteries.

A further object of the present invention is to prevent undercharging of batteries.

Another object of the present invention is to provide a battery charging apparatus of the push-button (push to start) type which is automatic in its operation, once set for a particular type of battery.

Still a further object of the present invention is to provide a battery charging apparatus which can be operated by a person without technical training.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed, without departing from the spirit of the invention.

The invention in its broader aspects contemplates an apparatus for charging batteries which comprises in combination, constant current charging means for connection to the battery to be charged, supplying a D.-C. current to the battery at a higher voltage than the battery terminal voltage; sensing means likewise connected to the battery, sensing the terminal potential of the battery; relay switching means interposed between the components of the apparatus to control the charge which the constant current charging means is supplying to the battery in accordance with information supplied by the sensing means; timing means controlled by the relay switching means for memorizing the elapsed time of full rate charge applied to the battery; and, interval timing means connected to the timing means for supplying to the battery a charge at a lesser amperage for a presettable percentage of the time that the full charge was applied.

Other objects and advantages of the invention will become apparent from the following description taken in conjunction with the accompanying drawing in which:

FIGURES 2a and 2b show a schematic diagram of the invention.

Figure 1:
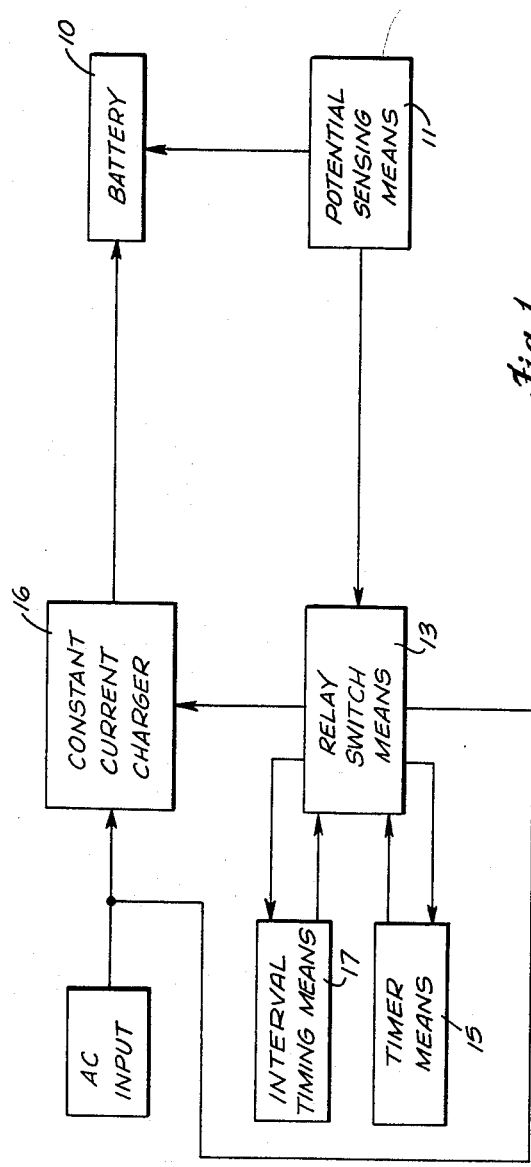
FIGURE 1 illustrates the invention in block diagram.

After considerable experiments with batteries it has been established that a battery can best be charged by a multiple constant current rate system. The initial rate of charging can be based on the 6 hour capacity of the battery. When the battery has received about 90% of the energy taken from the cells during discharge, there is a steep rate of rise of battery terminal potential which is followed by gassing. The high rate charging cycle should be interrupted at this point and the rate of charge reduced to a fraction of the initial rate. This value is chosen so as not to cause gassing or overheating of the cells and is generally about 25% of the initial charging rate. The time for this overcharge cycle should be such that the ampere hours of overcharge is directly related to the ampere hours of discharge. This relationship is dependent on the type of storage battery and the ambient temperature during the charge conditions. For many types of cells this works out to be an overcharge of from 30 to 70% of the discharge ampere hours. Thus, if we have a 180 ampere hour battery which was discharged for 100 ampere hours and the desired overcharge was 40% based on a 25° C. ambient temperature, we would initially charge at 30 amperes for 3 hours, and then charge at 7½ amperes for 6⅔ hours, which would provide an overcharge of 40 ampere hours.

Generally speaking, the apparatus of the present invention will sense the terminal potential of the battery while charging the battery at a high constant current rate until it has reached approximately 90% of full charge, meanwhile timing the charge; switch to a low rate charge when the sensing means indicate that the battery is approximately 90% charged; charge the battery at the low rate charge for a preset percentage of the time of the high rate charge; and finally, either shut itself off or place the battery on a very low constant current float charge.

In carrying the invention into practice, the battery voltage of battery 10 is being sensed at all material times while under charge by sensing means 11. When the starting button 12 is pressed, a relay switch 33 in relay switching means 13 will be at high rate relay point 14 and the timing means 15 is activated through relay point 52. Constant charger 16 will then begin to charge the battery 10 at a preset high current, starting the timing cycle. The 90% full charge condition of the battery will result in an abrupt change of slope of the battery terminal potential rise. When this condition occurs, the relay switching means 13 reverses the phase of the timing motor in timing means 15 and the time taken for the high rate of charge is played back. Meanwhile the relay circuitry has also activated the recycling or interval timing means 17, which periodically interrupts the timing motor drive voltage for a predetermined time interval so that the timing motor is allowed to operate for a preset fraction of each cycle of the interval timing means. At this same condition, the relay circuitry of relay switching means 13 will also switch constant current charger 16 from the high rate relay point 14 to low rate relay point 18. In this way, during the time period set by the timing means 15 and by the interval timing means 17, the battery 10 is being overcharged at a low rate for a presetable percentage of the high rate charge. When this overcharge has been completed and the timing means 15 completes its cycle, the apparatus shuts down. Alternately, after this predetermined time, a third relay arrangement can be activated to supply a very low constant current float charge to the battery, should this feature be desirable for certain types of cells.

In connecting the battery under test to the apparatus, separate connections are made from the battery positive and negative terminals to the sensing means input terminals 18a and 18b and to the constant current charger output terminals 19a and 19b. In practice, the output section 20 comprising the sensing means terminals 18a and 18b and the constant current charger output terminals 19a and 19b are combined in a four pin connector plug. The sensing terminals 18a and 18b lead to the sensing means 11.

Upon pushing push-button 12, a circuit 27 will activate solenoid 28, closing a series of relay switches 29. Relay switch contacts 76 and 30 closes the circuit to sensing means 11; relay switch 31 closes the circuit to the input transformer 32 and amplifier supply transformer 41 of constant current charger 16; contacts 65 and 66 engage to supply power to interval timer means 17 and to the control circuit of timer means 15; contacts 63 and 57 engage to complete the holding circuit for solenoid 28.

Constant current charger 16 consists of a self-saturating magnetic amplifier 35, controlled by driver transistor 37 and differential amplifier 36; bridge rectifiers 46, 47, 48 and 49; filter coil 38, and charging current sensing element 39.

The voltage developed across charging current sensing element 39 is positive at 1 and negative at 2. The negative voltage point 2 is connected to one input of differential amplifier 36 through noise filter 40. The floating reference voltage 42 is tapped off proportionate to the charge rate desired by low rate potentiometer 43 and high rate charge potentiometer 44. The polarity of each point is positive with respect to point 3 which is the other input to differential amplifier 36. Upon command of the charger circuitry, relay contact 33 of switching means 13 selects the appropriate reference voltage which appears at relay contact 18 or 14, being the preset low rate and high rate reference voltage, respectively. This voltage is returned to the positive side 1 of charging current sensing element 39. It is apparent that at some rate of charge, the voltage developed across charging current sensing element 39 will be equal and opposite to the selected reference voltage and differential amplifier 36 will become balanced. At this point a signal is fed to driver transistor 37 and the magnetic amplifier is desaturated the amount necessary to maintain the desired charging current. Line voltage fluctuations are corrected by resistor network 5 and 6. Temperature changes have little effect on the differential amplifier 36. To protect the equipment, a bridge rectifier arrangement is used. Unidirectional elements 46 and 47 are in one output leg of magnetic amplifier 35 to output terminal 19a, while unidirectional elements 48 and 49 are in the other output leg to terminal 19b.

During the high rate charge, current is fed to synchronous motor 50 of timing means 15 in the forward direction across the timer relay 51 set on forward point 52 by the relay solenoid 4 and switched to the reverse direction point 53 at the end of the high rate charge by relay solenoid 4, reversing the phase and direction of turning of timing motor 50. When timing relay 51 is switched to reverse direction point 53, the drive current for timing motor 50 is made to flow through the contacts 55 of interval timer 17, interrupting the drive current for a pre-set percentage of time. The cycle can be interrupted at any time by pressing the interrupter button 56 which opens the holding circuit for power control solenoid 28, thus de-energizing all circuits. Pressing start button 12 will cause the charge cycle to be resumed.

Sensing means 11 contains zener reference diode 21, and current limiting resistance 64, transistor 22, and transistor collector load resistance 8; and battery voltage sensing elements 24, 25, and 26, element 24 being an adjustable potentiometer. Potentiometer 24 is adjusted so that the voltage sample 7 is approximately equal to zener reference voltage 23 in a manner to make transistor 22 conduct when the sensed voltage reaches a magnitude corresponding to a point on the increased rate of rise slope of battery voltage, which occurs at approximately 90% of full charge condition and is fairly constant for most types of batteries, i.e., lead acid, nickel cadmium.

Thus, when a battery 10, in some condition of discharge, is connected to output connector 20 and start charge button 12 is pressed, solenoid 28 of switching means 13 is energized through the contacts of button 12, and held in the energized condition through the normally closed contacts of limit switch 9 of timer assembly 15, the normally closed contacts of interrupt charge button 56, and through relay contacts 57 and 63 of relay 28 in switching means 13. In this condition, contacts 76 and 30 of relay 28 are engaged and sensing means 11 is connected to battery sensing terminals 18a and 18b. Power is applied to constant current charger 16 through the engaged relay contacts 59 and 31 of relay 29; also, through the engaged contacts 65 and 66 of relay 29, power is applied to interval timer means 17 and to the forward phased input of timer means 15 through contacts 51 and 52 of relay 4 of switching means 13. Relay 4, being unenergized, delivers a high rate charge reference voltage 44 to the differential amplifier 36, and the constant current charger 16 will start the cycle at this rate. The high rate charge will continue until relay 4 is energized to switch the reference voltage being fed the differential amplifier 36 from point 44 to point 43. This is accomplished either by sensing means 11 causing relay 58 to be energized and closing contacts 60 and 67, or by the closure of contacts 74 and 75 of limit switch 9b in timer means 15.

Timer means 15 in practice consists of a synchronous motor 50; phasing network 69; time limit switch 9b; overcharge limit switch 9a; and a speed reduction unit coupled to synchronous motor 50, with a lever arm to actuate limit switches 9a and 9b which are double-pole double-throw switches, one mounted at each end of the travel of the lever arm so as to be actuated by the lever arm. The speed reduction ratio is such that six hours of continuous operation of synchronous motor 50 are required to move the arm between limits as set by the switches 9a and 9b. At the beginning of the charge cycle, limit switch 9a has contacts 72 and 73 engaged, and limit switch 9b is in close proximity to limit switch 9a, although not actuating it. The lever arm begins its travel towards limit switch 9b. Prior to the end of six hours, the sensing means 11 will normally have energized relay 58, in turn energizing relay 4 and in turn switching the charger to its low rate charge mode. However, should a battery condition such as a faulty cell exist and the preset voltage required to actuate sensing means 11 not be present at the end of six hours, the lever arm will actuate limit switch 9b and cause its contacts 74 and 75 to become engaged. This will apply power to relay solenoid 4, causing contacts 33 and 18 of relay 4 to engage and switch the constant current charger 16 from high rate to low rate charge; relay contact 51 of relay 4 switches from contact 52 to 53, removing power from the forward connection 68 of timer means 15 and applying it to reverse connection 54 of timer means 15 through contacts 55 of interval timer means 17. The lever arm then travels in the reverse direction towards limit switch 9a, with the synchronous motor 50 being activated at a preset percentage of time by interval timer 17. When the lever arm actuates limit switch 9a, contacts 72 and 73 are open and 70 and 71 are engaged. The opening of contacts 72 and 73 of limit switch 9 cause the holding circuit of power control relay 29 to be opened and relay 29, i.e., solenoid 28 becomes de-energized removing power from all circuits, turning the charger off. To restore the timing means 15 to the proper condition for the next charge cycle, by-pass switch contacts 70 and 71 of limit switch 9a in timer means 15 are provided. Power is supplied from the A.-C. input through the now closed contacts 70 and 71 of limit switch 9a and through contacts 51 and 52 of relay 4, now unenergized, to the forward connection 68 of timer means 15. The lever arm will travel in the forward direction until the switch reverts to its normal condition, opening the by-pass circuit. The entire cycle is complete at this point. It is evident however, that additional circuitry comprising either a manually operated switch or an automatic relay type switching arrangement may easily be incorporated to provide a low current float charge, should this be desirable for special applications such as standby emergency power where charger and battery are jointly employed. As an example of this feature of the apparatus, there is shown still another arrangement, namely, switch 62 which allows the low rate charging time to be lengthened indefinitely by manual interruption of the drive voltage from synchronous motor 50. Switch means 61 for monitoring the battery terminal potential may also be added to the apparatus.

It is to be observed therefore that the present invention provides for an apparatus for automatically charging a battery at various preset constant current charging rates, and comprises in combination, a constant current charger 16 for supplying a D.-C. charging current to battery 10; sensing means 11 connected to the battery, sensing the terminal potential; relay switching means 13 for controlling the charger in accordance to commands from the timer means 15 and/or sensing means 11; an electromechanical timer means 15 for converting elapsed high rate charge time into mechanical rotation, and being electrically reversible including limit switches; interval timer means 17 connected to the timer means 15 to allow the battery to receive a charge at a low current rate for a preset percentage of the time required for the high rate charge. Thus, when on high rate charge, timer means 15 times the charge; upon command of sensing means 11 or limit switch 10 of timer means 15, the charging current is reduced to a preset low rate charge; timer motor 50 is reversed and plays back the accumulated time at a slower rate, determined by the setting of the interval timer means 17; at the end of the cycle, the charger will either shut itself off, or may be arranged with additional circuitry to provide a float charge for the battery.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A battery charging apparatus, comprising in combination, constant current charging means for connection to a battery to be charged, for supplying a D.-C. current to the battery at a higher voltage than the battery terminal voltage including means to charge said battery at a high rate and a low rate; sensing means likewise connected to the battery, sensing the terminal potential of the battery; said sensing means including output means to provide an indication of a predetermined condition of said terminal potential, relay switching means to control the charge rate at which the constant current charging means is charging the battery and to switch said charging means from charging at said high rate to charging at said low rate in response to said output means providing said indication; timing means controlled by the relay switching means for registering the elapsed time of high rate charge applied to the battery, said timing means including means for terminating the charging of the battery at said low rate after the battery has been charged at said low rate for a presettable percentage of the time that the battery was charged at said high rate.

2. A device as claimed in claim 1, said constant current charging means comprising a self-saturating magnetic amplifier.

3. A device as claimed in claim 1, said sensing means including a Zener reference diode, and battery voltage sensing elements at least one of which is adjustable, with a transistor interposed between said reference diode and sensing elements, said adjustable sensing element being so adjustable that the battery voltage sensed will be approximately equal to the Zener reference voltage in a manner to make said transistor conduct when the sensed voltage reaches a magnitude corresponding to a point on the increased rate of rise slope of battery voltage which occurs at approximately 90% of the full charge condition.

4. A device as claimed in claim 1, said timing means including a timer relay having a forward and reverse point, said timing means being fed current of one phase during the time that the battery is charged at said high rate and of the opposite phase during the time that the battery is charged at said low rate, and a synchronous motor whose direction of turn depends on the phase relationship of current flow.

5. A device as claimed in claim 4 including overcharge limit switch means to cause said charging means to switch from charging at a high rate to charging at a low rate in the event of a faulty battery unable to provide a response to be sensed by said sensing means.

References Cited by the Examiner

UNITED STATES PATENTS

| | | | |
|---|---|---|---|
| 2,227,118 | 12/40 | Amsden | 320—23 |
| 2,272,745 | 2/42 | Hinds et al. | 320—23 |
| 2,774,028 | 12/56 | Burkholder | 320—23 |
| 2,978,633 | 4/61 | Medlar | 320—39 |
| 3,054,992 | 9/62 | Zoglio | 58—39.5 |
| 3,088,270 | 5/63 | King | 58—39.5 |

LLOYD McCOLLUM, *Primary Examiner.*